(12) United States Patent
Simionescu et al.

(10) Patent No.: US 10,223,009 B2
(45) Date of Patent: Mar. 5, 2019

(54) METHOD AND SYSTEM FOR EFFICIENT CACHE BUFFERING SUPPORTING VARIABLE STRIPE SIZES TO ENABLE HARDWARE ACCELERATION

(71) Applicant: Avago Technologies International Sales Pte. Limited, Singapore (SG)

(72) Inventors: Horia Simionescu, Foster City, CA (US); Timothy Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/335,037

(22) Filed: Oct. 26, 2016

(65) Prior Publication Data
US 2018/0113634 A1    Apr. 26, 2018

Related U.S. Application Data

(60) Provisional application No. 62/410,752, filed on Oct. 20, 2016.

(51) Int. Cl.
*G06F 12/00* (2006.01)
*G06F 3/06* (2006.01)
*G06F 12/0864* (2016.01)
*G06F 12/0895* (2016.01)
(Continued)

(52) U.S. Cl.
CPC ............ *G06F 3/0619* (2013.01); *G06F 3/065* (2013.01); *G06F 3/067* (2013.01); *G06F 3/0659* (2013.01); *G06F 3/0689* (2013.01); *G06F 12/0864* (2013.01); *G06F 12/0871* (2013.01); *G06F 12/0875* (2013.01); *G06F 12/0895* (2013.01); *G06F 2212/1016* (2013.01); *G06F 2212/302* (2013.01); *G06F 2212/452* (2013.01); *G06F 2212/604* (2013.01); *G06F 2212/621* (2013.01)

(58) Field of Classification Search
None
See application file for complete search history.

(56) References Cited

U.S. PATENT DOCUMENTS

| | | |
|---|---|---|
| 5,931,920 A | 8/1999 | Ghaffari et al. |
| 6,640,290 B1 | 10/2003 | Forin et al. |
| 7,730,239 B2 | 6/2010 | Chang et al. |

(Continued)

*Primary Examiner* — Midys Rojas
(74) *Attorney, Agent, or Firm* — Sheridan Ross P.C.

(57) ABSTRACT

A system and method for efficient cache buffering are provided. The disclosed method includes receiving an Input/Output (I/O) command from a host system at a storage controller, parsing the I/O command at the storage controller with a host I/O manager to extract command instructions therefrom. The host I/O manager is able to generate at least one local message that includes the command instructions extracted from the I/O command and transmit the at least one local message to a cache manager. The cache manager is enabled to work in local memory to execute the command instructions contained in the at least one message. The cache manager is also configured to chain multiple buffer segments together on-demand to support multiple stripe sizes that are specific to the I/O command received from the host system.

20 Claims, 15 Drawing Sheets

(51) Int. Cl.
 *G06F 12/0871* (2016.01)
 *G06F 12/0875* (2016.01)

(56) References Cited

U.S. PATENT DOCUMENTS

| | | |
|---|---|---|
| 8,266,116 B2 | 9/2012 | Agarwal et al. |
| 9,134,909 B2 | 9/2015 | Padia et al. |
| 9,280,609 B2 | 3/2016 | Liu |
| 2004/0128463 A1 | 7/2004 | Kim et al. |
| 2007/0156997 A1 | 7/2007 | Boule et al. |
| 2013/0326154 A1 | 12/2013 | Haswell |

| Flags | Buffer Segment ID0 |
| --- | --- |
| Flags | Buffer Segment ID1 |
| Flags | Buffer Segment ID2 |
| Flags | Buffer Segment ID3 |
| Flags | Buffer Segment ID4 |
| Flags | Buffer Segment ID5 |
| Flags | Buffer Segment ID6 |
| Flags | Buffer Segment ID7 |
| Flags | Buffer Segment ID8 |
| Flags | Buffer Segment ID9 |
| Flags | Buffer Segment ID10 |
| Flags | Buffer Segment ID11 |
| Flags | Buffer Segment ID12 |
| Flags | Buffer Segment ID13 |
| Flags | Buffer Segment ID14 |
| Flags | Buffer Segment ID15 |

360b

| Flags | Buffer Segment ID0 |
| --- | --- |
| Flags | Buffer Segment ID1 |
| Flags | Buffer Segment ID2 |
| Flags | Buffer Segment ID3 |
| Flags | Buffer Segment ID4 |
| Flags | Buffer Segment ID5 |
| Flags | Buffer Segment ID6 |
| Flags | Buffer Segment ID7 |
| Flags | Buffer Segment ID8 |
| Flags | Buffer Segment ID9 |
| Flags | Buffer Segment ID10 |
| Flags | Buffer Segment ID11 |
| Flags | Buffer Segment ID12 |
| Flags | Buffer Segment ID13 |
| Flags | Buffer Segment ID14 |
| Flags | Buffer Segment ID15 |

METHOD AND SYSTEM FOR EFFICIENT CACHE BUFFERING SUPPORTING VARIABLE STRIPE SIZES TO ENABLE HARDWARE ACCELERATION

CROSS-REFERENCE TO RELATED APPLICATIONS

This Non-Provisional Patent Application claims the benefit of U.S. Provisional Patent Application No. 62/410,752, filed Oct. 20, 2016, the entire disclosure of which is hereby incorporated herein by reference.

FIELD OF THE DISCLOSURE

The present disclosure is generally directed toward computer memory.

BACKGROUND

Traditional caching algorithms in large storage architectures (e.g., MegaRAID) inherently require region locks to avoid data inconsistency. The same buffers are often re-used for all read/writes for given strip/stripe. Hence it is required to make sure that no two Direct Memory Access (DMA) operations act on the same buffers. This effectively creates a need for serialization to make sure that no two Input/Output (I/O) commands act on the same buffer at the same time.

Unfortunately, existing caching algorithms have high latency. Another drawback to existing caching algorithms is that they are highly coupled and very difficult to decouple for purposes of achieving hardware automation.

BRIEF DESCRIPTION OF THE DRAWINGS

The present disclosure is described in conjunction with the appended figures, which are not necessarily drawn to scale:

FIG. 4 is a block diagram depicting additional details of a cache frame buffer segment in accordance with at least some embodiments of the present disclosure;

DETAILED DESCRIPTION

Figure 1:
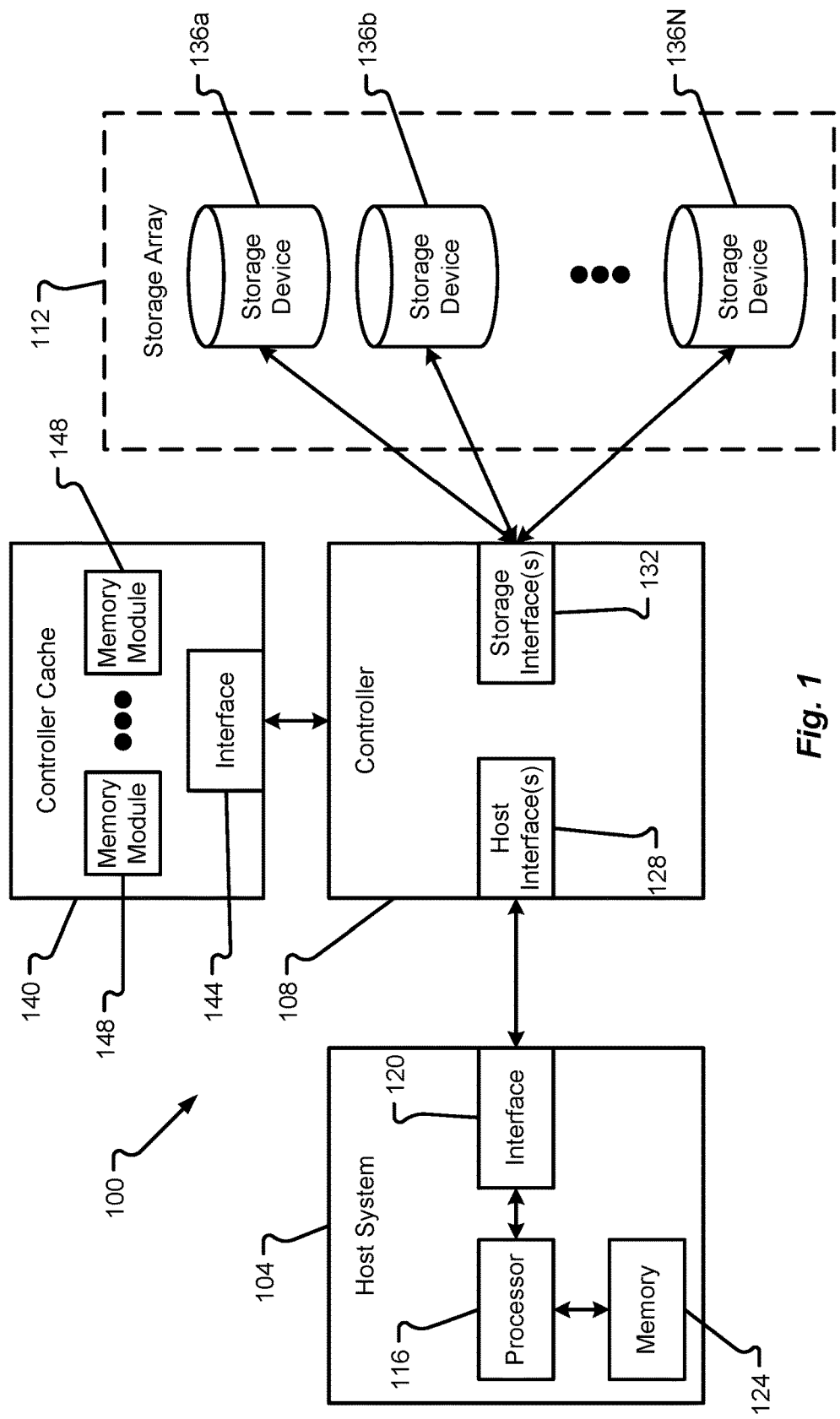
FIG. 1 is a block diagram depicting a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As will be discussed in further detail herein, embodiments of the present disclosure present a scalable design for multiple stripe size support to enable hardware acceleration. A unique cache segment frame structure is also provided to enable hardware acceleration that contains various sub-cache frames such as to represent an entire 1 MB of cache data.

In some embodiments, a proposed method introduces various cohesive functional blocks which can bring in parallelism and thereby enabling hardware automation by staged pipeline.

Furthermore, a unique method of maintaining an Internal Scatter Gather List (ISGL) which represents the snapshot of data at a given point in time is used. In some embodiments, the ISGL is capable of encapsulating all the metadata that is required for an I/O read/write and flush request, thereby providing an efficient communication mechanism between various modules for processing the read/write and flush operations.

The ISGL data snapshot method ensures that overlapped Read, Writes along with flush can be issued concurrently without the need of region locks or other methods of serialization.

The inherent design of the write buffering algorithms can further eliminate the use of region locks and ensure full concurrency of the read/write operations, providing consistent ultra-low latency and high IOPs on all Raid levels.

In some embodiments, the present disclosure presents an advanced write buffering process that utilizes various functional blocks of a controller to enable hardware acceleration. The processes described herein are designed such that various different functional blocks can be accelerated by different hardware threads. In some embodiments, each of the functional blocks may work in its own local memory loading the global memory whenever there is a need and storing back to the global memory when the functional block is done with the usage/update.

Although embodiments of the present disclosure will be described in connection with managing a RAID architecture (e.g., a RAID-0 or RAID-1 type of architecture), it should be appreciated that embodiments of the present disclosure are not so limited. In particular, any controller that finds benefits associated with supporting variable stripe sizes can implement some or all of the functions and features described herein.

With reference to FIGS. 1-11, various embodiments of the present disclosure will be described. While many of the examples depicted and described herein will relate to a RAID architecture, it should be appreciated that embodiments of the present disclosure are not so limited. Indeed, aspects of the present disclosure can be used in any type of computing system and/or memory environment. In particular, embodiments of the present disclosure can be used in any type of caching scheme (whether employed by a RAID controller or some other type of device used in a communication system). In particular, hard drives, hard drive controllers (e.g., SCSI controllers, SAS controllers, or RAID controllers) may be configured to implement embodiments of the present disclosure. As another example, network cards or the like having cache memory may also be configured to implement embodiments of the present disclosure.

With reference now to FIG. 1, additional details of a computing system 100 capable of implementing hashing methods and various cache lookup techniques will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136a-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, . . . , RAID-5, RAID-6, etc.).

In a RAID-0 (also referred to as a RAID level 0) scheme, data blocks are stored in order across one or more of the storage devices 136a-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block. Higher level RAID schemes can further segment the data into bits, bytes, or blocks for storage across multiple storage devices 136a-N. One or more of the storage devices 136a-N may also be used to store error correction or parity information.

A single unit of storage can be spread across multiple devices 136a-N and such a unit of storage may be referred to as a stripe. A stripe, as used herein and as is well known in the data storage arts, may include the related data written to multiple devices 136a-N as well as the parity information written to a parity storage device 136a-N. In a RAID-5 (also referred to as a RAID level 5) scheme, the data being stored is segmented into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

One of the functions of the controller 108 is to make the multiple storage devices 136a-N in the array 112 appear to a host system 104 as a single high capacity disk drive. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manager the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 or a smaller number of cache memory modules 148. The memory modules 148 may correspond to flash memory, RAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
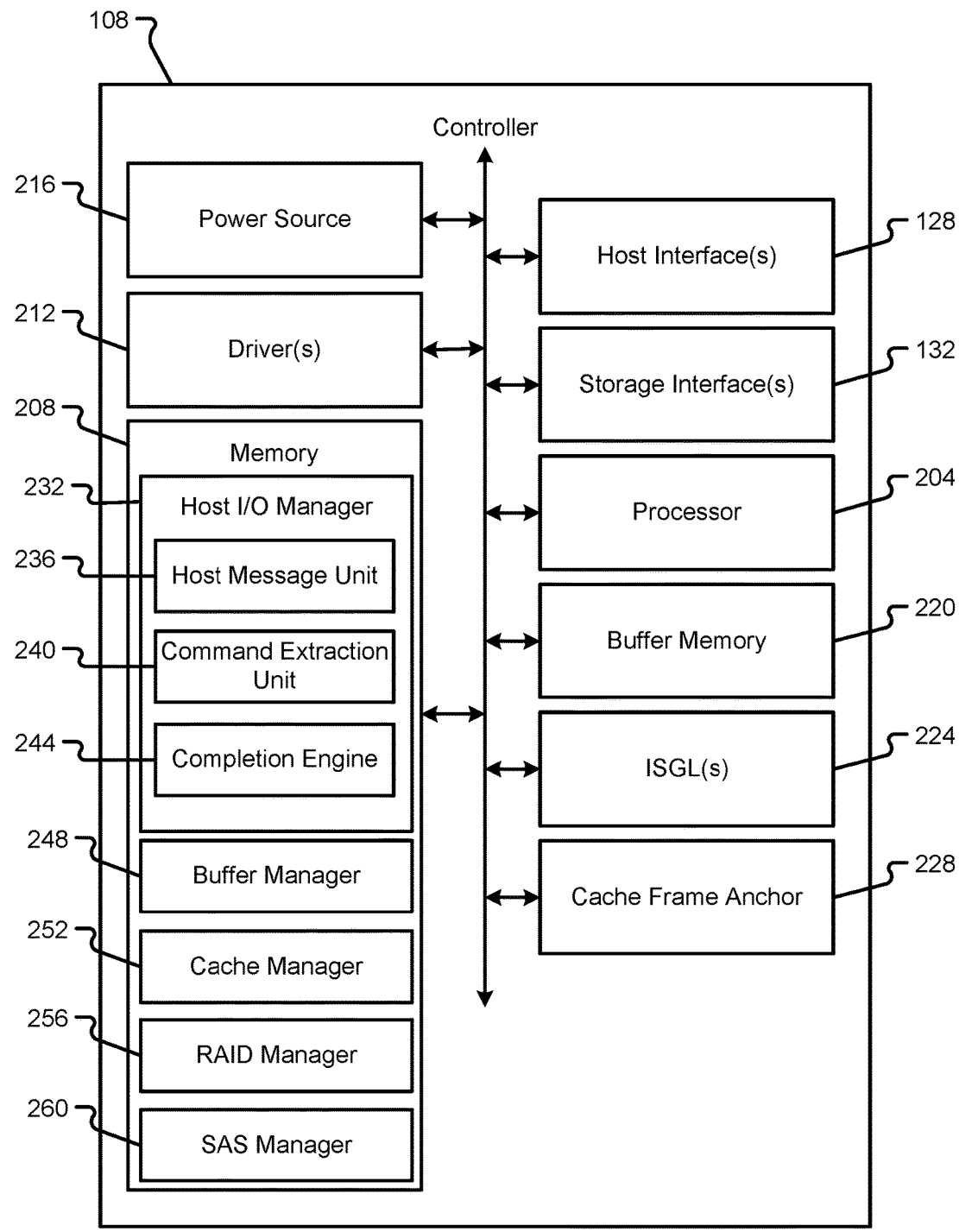
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220, one or more ISGLs 224, and a cache frame anchor 228. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an NPI protocol. The host message unit 236 may bring down the messages received from the host system 104 and pass the content of the messages to the command extraction unit 240. The command extraction unit 240 may be configured to determine if a particular command in a message is acceleratable (e.g., capable of being passed to a particular functional block to facilitate hardware acceleration). If a command is determined to be acceleratable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. As an example, the cache manager 252 may enable the processor 204 to respond to read commands. The cache manager 252 may also enable the processor 204 to communicate with the controller cache 140 and leverage the memory modules 148 of the controller cache 140. The cache manager 252 may also manage the creation and lifecycle of cache frame anchors 228 and/or ISGLs 224. As an example, as caching functions are executed, one or more cache frame anchors 228 may be created or utilized to facilitate the caching function.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if not caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

Figure 3:
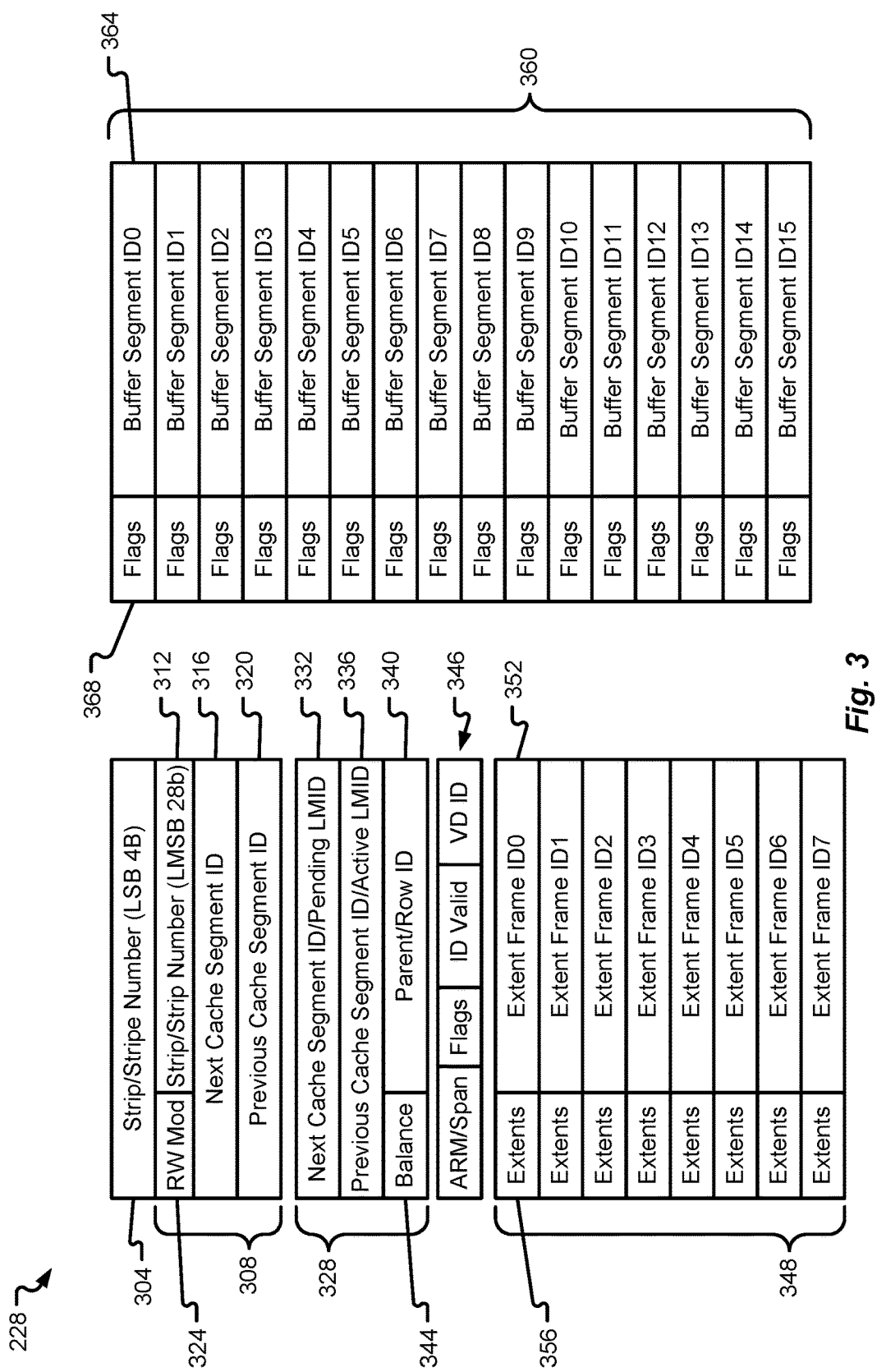
FIG. 3 is a block diagram depicting additional details of a cache frame anchor in accordance with at least some embodiments of the present disclosure.

With reference now to FIG. 3, additional details of a cache frame anchor 228 will be described in accordance with at least some embodiments of the present disclosure. Although FIG. 3 shows the cache frame anchor 228 as having a particular layout/organizational structure, it should be appreciated that the cache frame anchor 228 may be configured in any number of ways without departing from the scope of the present disclosure. The cache frame anchor 228 may correspond to a data structure that is created and managed by the cache manager 252 or other components in memory 208.

The cache frame anchor 228 is shown to include a strip/stripe number field 304, a hash section 308, a dirty list section 328, an identity section 346, an extents section 348, and a buffer segment section 360. The various sections of the cache frame anchor 228 may be used to store data that enables the controller 208 to utilize variable stripe sizes, thereby taking advantage of different workloads (where different types of commands require different amounts of memory and processing capabilities). In some embodiments, the cache manager 252 shouldn't need to worry about strip sizes, but it would be desirable to enable the cache manager 252 to effectively and efficiently respond to different types read of commands in an appropriate way.

The strip/stripe number field 304 may store data that identifies the strip/stripe for which the cache frame anchor 228 is being used. In some embodiments, the strip/stripe field 304 may uniquely identify a strip or stripe. In some embodiments, the strip/stripe field 304 may identify a memory location (e.g., a starting location) of a strip or stripe of data stored in a storage device 136. For instance, the strip/stripe field 304 may store a number that has been assigned to a particular stripe of data.

The hash section 308 includes a RW module field 324, a strip/stripe field 312, a next cache segment ID field 316, and a previous cache segment ID field 320. The RW module field 324 may contain information that describes the cache memory module 148 that is being used to support a particular caching operation. The strip/stripe field 312 may contain information that is similar or identical to the strip/stripe number field 304. The strip/stripe field 312 may store information about a particular strip/stripe number whereas the strip/stripe field 304 may store information about a plurality of first strip/stripes or a first strip/stripe in a group of strips/stripes.

The next cache segment ID field 316 and previous cache segment ID field 320 may be used to track a balance of a tree/chain structure. The cache frame anchor 228 may organize data based on LBA and based on a tree structure. As buffer segments are needed to accommodate the need for more buffer memory, the cache frame anchor 228 may be updated to reflect the addition of buffer segments to the tree/chain. The fields 316, 320 may store information that links specific cache segment IDs to one another in this tree/chain structure, thereby facilitating the creation of variable stripe sizes. As the names suggest, the next cache segment ID 316 may contain information that identifies a next cache segment in a chain of cache segments (relative to a currently allocated cache segment) whereas the previous cache segment ID 320 may contain information that identifies a previous cache segment in a chain of cache segments (relative to the currently allocate cache segment). As additional cache segments are added to the tree/chain, the fields 316, 320 may both be updated to continue tracking the progressive building of the cache segment chain.

The dirty list section 328 is shown to include a next cache segment ID/pending LMID field 332, a previous cache segment ID/active LMID field 336, a balance field 344, and a parent/row ID field 336. The dirty section list 328 may contain data and/or metadata that enables the creation of a double link list. The fields 332, 336 may be similar to fields 316, 320 in that fields 332, 336 contain LMID information for previous and next cache segments in a tree or chain of cache segments. These fields may be updated as additional cache segments are added to the tree or chain. The information contained in fields 332, 336 may include any information used to identify a cache segment that has a pending and/or active LMID. In some embodiments, the next cache segment ID field 332 stores information related to a cache segment ID that has a pending LMID whereas the previous cache segment ID field 336 stores information related to a cache segment ID that has an active LMID. The balance field 344 may contain information that tracks the balance of a cache segment tree or chain (e.g., a number of blocks in the chain or a number of blocks remaining until no further blocks are available). The parent/row ID field 340 may contain information that identifies a row of data stored in the storage array 112.

The identity section 346 may contain a number of fields that store information related to an identity of the cache frame anchor 228. The cache frame anchor 228 may be identified by an ARM or span. In a RAID-0 architecture, all entries can be referred to as ARMS. The identity section 346 may also contain metadata that describes a logical drive number and the various extents 348 allocated for a cache segment. The flags in the identity section 346 may refer to nibbles of data in the extents 356. The flags stored in the identity section 346 may indicate one or more of the following: cache row frame information; whether a cache segment is to be overwritten while in flush, whether a hash hit event has occurred, whether a cache segment is in a read-ahead list, whether a buffer section extent is valid, and/or whether a row ID is not part of a tree parent ID.

The extents section 348 is shown to include a plurality of extent frames 352 and corresponding extents 356. In some embodiments, the extents 356 may store 2 nibbles of data that describe information contained within the extent section 348. As an example, the first extent frame ID0 may have its corresponding extent 356 store nibbles of data (01/00). The second extent frame ID1 may have its corresponding extent 356 store nibbles of data (11/10). The third extent frame ID2 may have its corresponding extent 356 store nibbles of data (21/20). The fourth extent frame ID3 may have its corresponding extent 356 store nibbles of data (31/30), and so on for the other extent frames 352. By providing the extent frames 352 consecutively in memory, the extents 352 in the extents section 348 can be scaled to store up to 1 MB of data in total (or more). In some embodiments, each extent 352 can represent up to 64 kB of data. Hence, for a stripe size of 64 kB only one extent that fits in the cache frame anchor 228 is needed. For a 1 MB stripe size, sixteen extents 352 would be needed (if each extent 352 represents 64 kB of data), which means that a total of seventeen cache frame anchors would be needed (including the metadata). Although eight extents 356 and extent frames 352 are depicted, it should be appreciated that a greater or lesser number of extents 356 and extent frames can be used without departing from the scope of the present disclosure. By enabling the chaining of multiple extents, variable stripe sizes can be accommodated. In some embodiments, not all extents 356 or extent frames 352 are allocated upon creation of the cache frame anchor 228. Instead, extents 356 and extent frames 352 can be allocated on an as-needed basis (e.g., in response to different commands). As can be appreciated, data stored in the cache frame anchor 228 may be cleared when the corresponding data is committed to a storage media (e.g., a storage device 136).

The buffer segment section 360 is shown to include a plurality of buffer segments that include a buffer segment ID field 364 and a flag field 368. The buffer segment ID field 364 may be used to store identification information for buffer segments that have been used in buffer memory 220. A buffer segment section 360 may be configured to store up to twice as much data as the extents section 348. As an example, if the extension section 348 is configured to store up to 32 Bytes of data, then the buffer segment section 360 may be configured to store up to 64 Bytes of data. The flag field 368 may be configured to store flag information that indicates one or more of: whether a corresponding buffer segment is valid; whether a corresponding buffer segment is dirty; whether a corresponding buffer segment is flushing; whether a corresponding buffer segment has been trimmed; and/or a use count for a corresponding buffer segment.

As can be seen in FIG. 4, a plurality of buffer segment sections 360*a*, 360*b* are depicted. In some embodiments, each group of buffer segment sections 360*a*, 360*b* is represented by a corresponding extent. Said another way, an extent can be used to represent a plurality of aligned and contiguous buffer segments. In the depicted embodiment, a first extent is represented by the first plurality of buffer segment sections 360*a* and a second extent is represented by the second plurality of buffer segment sections 360*b*. As they come into existence (on an as-needed basis), the extents are grouped two-by-two, sharing one frame. The two nibbles of the extents n1/n0 field 356 in the cache frame anchor 228 indicate which two extents share the frame that is referenced by the extent frame ID field 352 in the cache frame anchor 228. An extent nibble is considered invalid when it is equal to the anchor's identity ID field 352 that is used to indicate the ordinal of the anchor's extent. When a next extent comes into existence, the extent gest stored into the first empty half-frame and if no half-frame is available, then a new frame gets allocated and that frame's ID is stored into the next available extent frame ID location in the cache frame anchor 228.

Although the buffer segment sections 360*a*, 360*b* are shown as being grouped into sixteen aligned and contiguous buffer segments, it should be appreciated that an extent can represent a greater or lesser number of buffer segments. Indeed, the depicted embodiment can utilize an extent to store up to 64 B of information. Greater or fewer buffer segments can be used to store a greater amount or lesser amount of data as desired.

Figure 5:
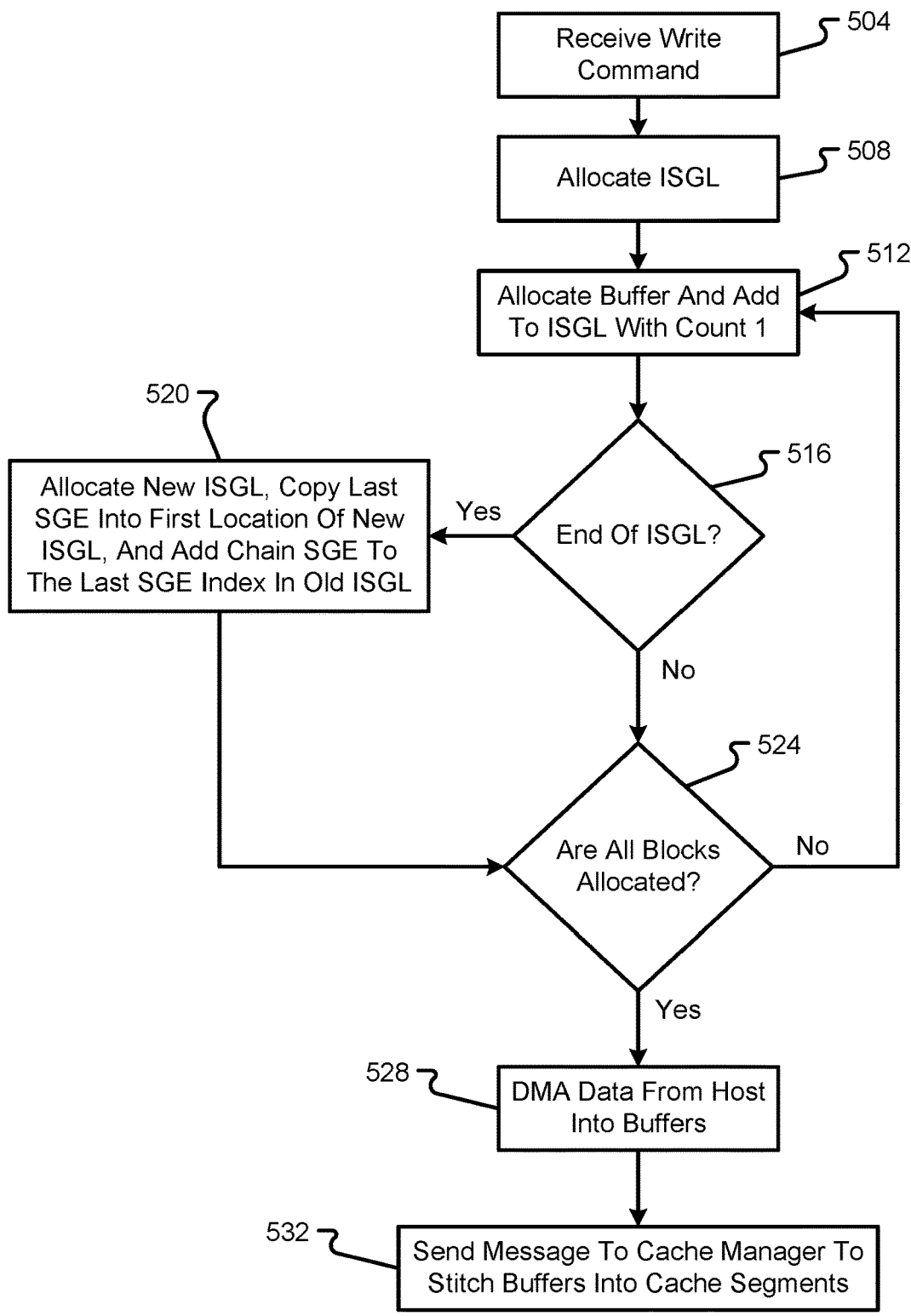
FIG. 5 is a flow diagram depicting a method of allocating write buffers in accordance with at least some embodiments of the present disclosure.

With reference now to FIG. 5, a method of allocating write buffers will be described in accordance with at least some embodiments of the present disclosure. The method begins when a write command is received at the host I/O manager 232 (step 504). The host I/O manager 232 may then provide an LMID (one or many) to the buffer manager 248 to further execute the write command. In some embodiments, the buffer manager 248 allocates the buffer segments from the buffer memory 220. The amount of data being written may dictate how many buffer segments are allocated by the buffer manager 248.

In some embodiments, the buffer manager 248 allocates buffer segments of 4 kB size and the buffer segment IDs are populated into the ISGLs to represent the complete I/O command. To accommodate this task, the buffer manager 248 may first allocate an ISGL (step 508). The buffer manager 248 may then allocate a buffer segment and add the ID of the allocated buffer segment to the allocated ISGL with a count of '1' (step 512). The buffer manager 248 then determines if it is reached the end of the ISGL (e.g., filled the first allocated ISGL) (step 516). If so, then the buffer manager 248 will allocate a new ISGL, copy the last Scatter Gather Extent (SGE) into the first location of the new ISGL, and add a chain of SGEs to the last SGE index in the previously-allocated (and now full) ISGL (step 520). Thereafter, or if the buffer manager 248 has not reached the end of the ISGL (as determined in step 516), the buffer manager

248 will continue by determining whether enough buffer segments have been allocated to support the write command (step 524). If this query is answered negatively, then the buffer manager 248 returns to step 512. If the query of step 524 is answered positively, then the buffer manager 248 sends the ISGL and the host SGL to copy the data from the host I/O manager 232 into the new buffer segments that have been allocated (step 528). In other words, the buffer manager 248 informs the host I/O manager 232 that the data can be committed from the host 104 into the buffer memory 220. Appropriate messaging is then sent from the buffer manager 248 to the cache manager 252 to stitch the buffer segments into cache segments, thereby enabling the allocated write buffers to receive the data from the host 104.

Figure 6:
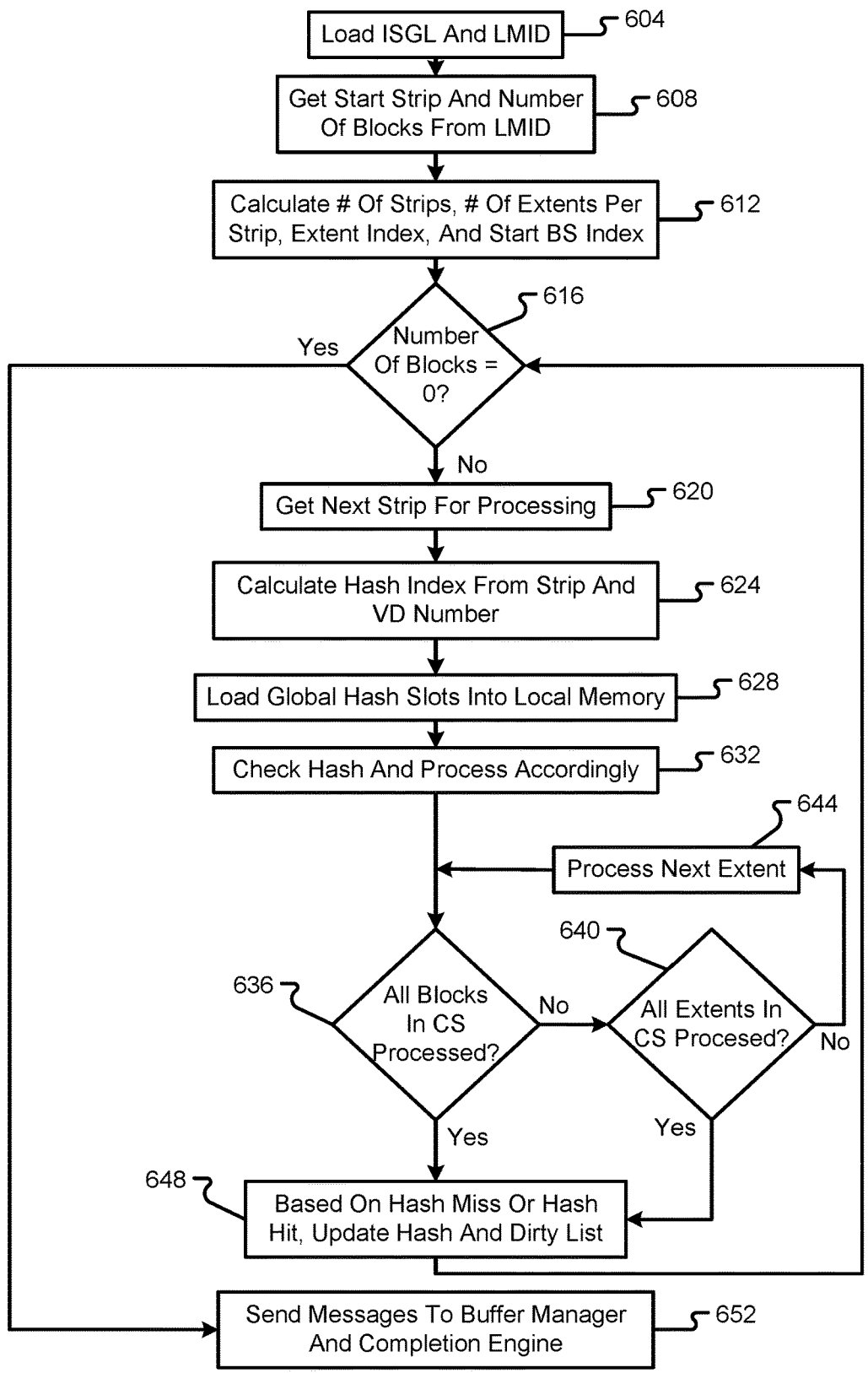
FIG. 6 is a flow diagram depicting a method of cache buffering in accordance with at least some embodiments of the present disclosure.

With reference now to FIG. 6, a method of cache buffering will now be described in accordance with at least some embodiments of the present disclosure. The method begins when an LMID is received at the cache manager 252 and an offset in the first arm is obtained from the LMID (step 604). The LMID may be received from the host I/O manager 232 or the buffer manager 248. This step may also include loading the ISGL that was received along with the LMID. The method continues by loading the LMID into local memory used by the cache manager 252 and then obtaining the start strip and the number of blocks from the LMID (step 608). This information is used to calculate the start LBA, the number of strips from the start strip that are spanned by the I/O command, the number of extents per strip, an extent index, and the start buffer segment index (step 612). In some embodiments, the start strip and the number of block are obtained directly from the LMID. The start LBA is calculated from the start strip. The number of strips needed from the start strip is calculated form the number of blocks needed to accommodate the I/O command. The number of extents per strip is calculated by dividing the strip size by the number of buffer segments in an extent. The extent index is calculated by dividing the offset in the first arm by the number of buffer segments in an extent.

The method then proceeds with the cache manager 252 determining whether the number of blocks equals zero (step 616). If this query is answered positively, then the cache manager 252 sends a message to the buffer manager 248 and completion engine 244 to indicate that the cache buffering process has been completed (step 652). This effectively allows the completion engine 244 to notify the host that the I/O command has been processed and perform any other actions consistent with such completion.

If the query of step 616 is answered negatively, then additional blocks remain before the I/O command is fully processed. Accordingly, the cache manager 252 will proceed by obtaining the next strip for processing (step 620). The cache manager 252 then calculates a hash index from the strip and virtual disk (VD) number (step 624). The cache manager 252 thereafter loads the global hash slots into its local memory (step 628) and begins checking if the calculated hash is presented in the global hash slots that are loaded into memory. In other words, the cache manager 252 checks to see if there is a hash hit. If a hash hit is present (e.g., the calculated hash is found in the existing hash slots), then the cache manager 252 will retrieve the corresponding cache segment ID from the hash and load that cache segment ID into local memory. If a hash hit is not presented, then the cache manager 252 will allocate a new cache segment frame and mark a flag for that cache segment to indicate that a hash miss occurred for this particular cache segment.

If a hash hit occurs, then the processing may also include having the cache manager 252 the cache segment metadata is populated with appropriate information (e.g., load number, stripe number etc.). The cache manager 252 may also check the metadata of the cache segment to see if the current extent is present. If it is present, then the cache manager 252 will obtain the cache segment frame ID for the current extent and load that information into local memory. If the extent is not present, then the cache manager 252 will check to see if there is a partial cache frame available in the extents section 248. If a partial cache frame is found to be available, then the partial cache frame will be used for the current extent. The extent section 248 is then updated to mark that the extent has been allocated. If there are no partial frames available, then a new cache frame is allocated and the first half of the frame is used for the current extent. The same is updated in the extent section 348 (e.g., the extent index 356 and extents frame ID are updated). Starting from the buffer segment index, the cache manager 252 will add the buffer segment IDs that are present in the ISGL into the buffer segment section. If a flag for a buffer segment section indicates that any buffer segment has a flush or read operation in progress, then the buffer segment ID and the flags for that buffer segment are updated in a global buffer segment ID table before it is replaced with a new buffer segment ID. If a buffer segment flag is not involved a flush or read operation and the current count is zero, then the existing buffer segment ID is freed and is replaced with the new buffer segment ID.

Once all blocks in the cache segment are processed (step 636), the cache manager 252 will determine if all of the extents in the cache segment have been processed (step 640). In particular, once all of the buffer segment IDs are populated in the buffer segment section for the current extent, the cache manager 252 will move to the next extent (step 644). The next extent will be processed starting with the buffer segment index 0 in the next extent.

After all extents and blocks have been processed, the method proceeds with the cache manager 252 updating a hash or dirty list based on whether or not a hash hit or miss occurred (step 648). If a hash hit occurred (e.g., a cache segment is not in the existing hash slots), then a new entry is added to the hash slots. In some embodiments, the hash with the new cache segment ID is allocated and added to a dirty Most Recently Used (MRU) list. If a hash miss occurs, then the cache segment is removed from the dirty list and added to the MRU list. The method will then return back to step 616 for further consideration and eventually proceed to step 652 when all blocks in the I/O command have been processed.

Figure 7A:
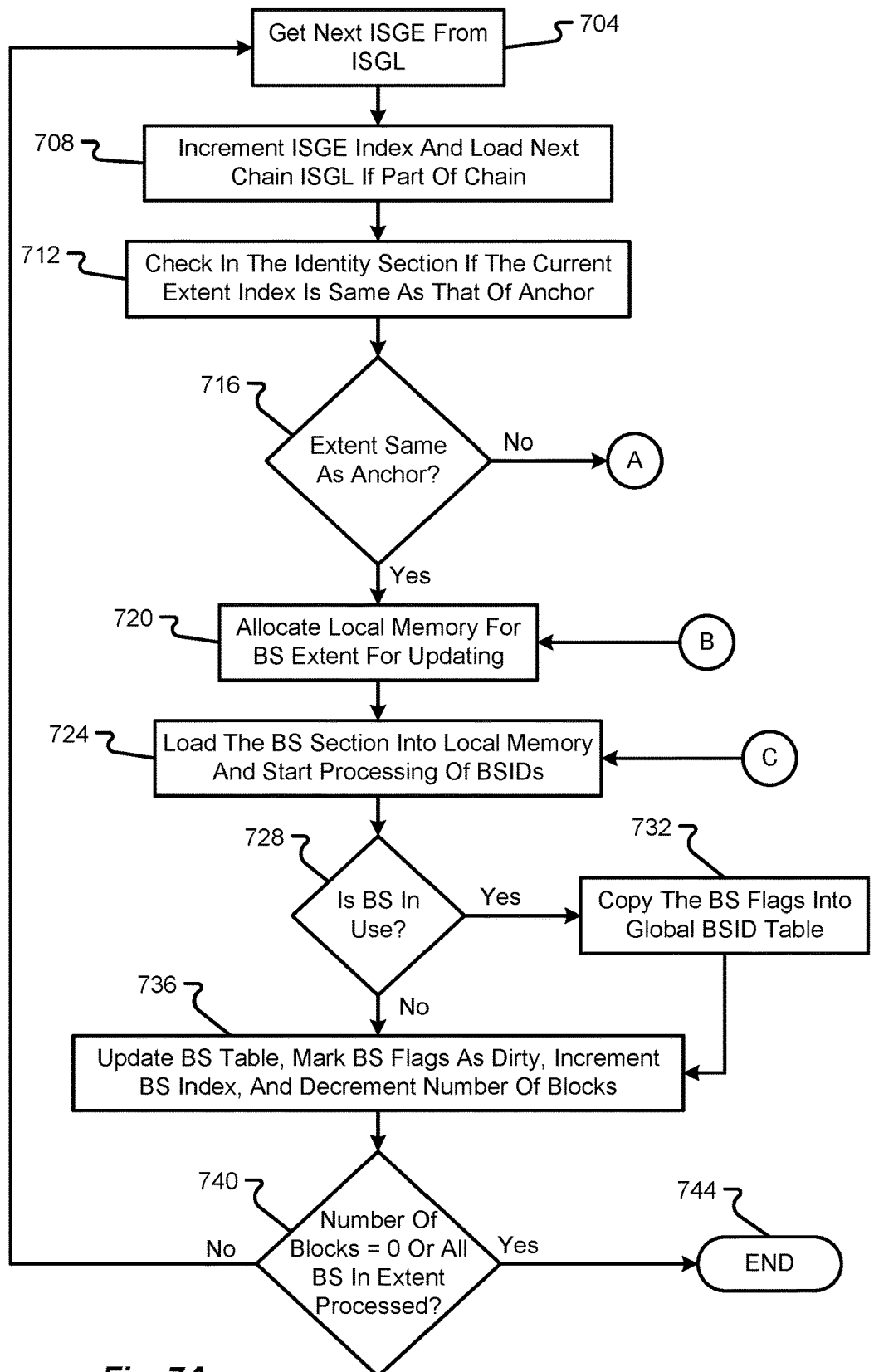
FIG. 7A is a first portion of a flow diagram depicting a method of processing an extent in accordance with at least some embodiments of the present disclosure.
Figure 7B:
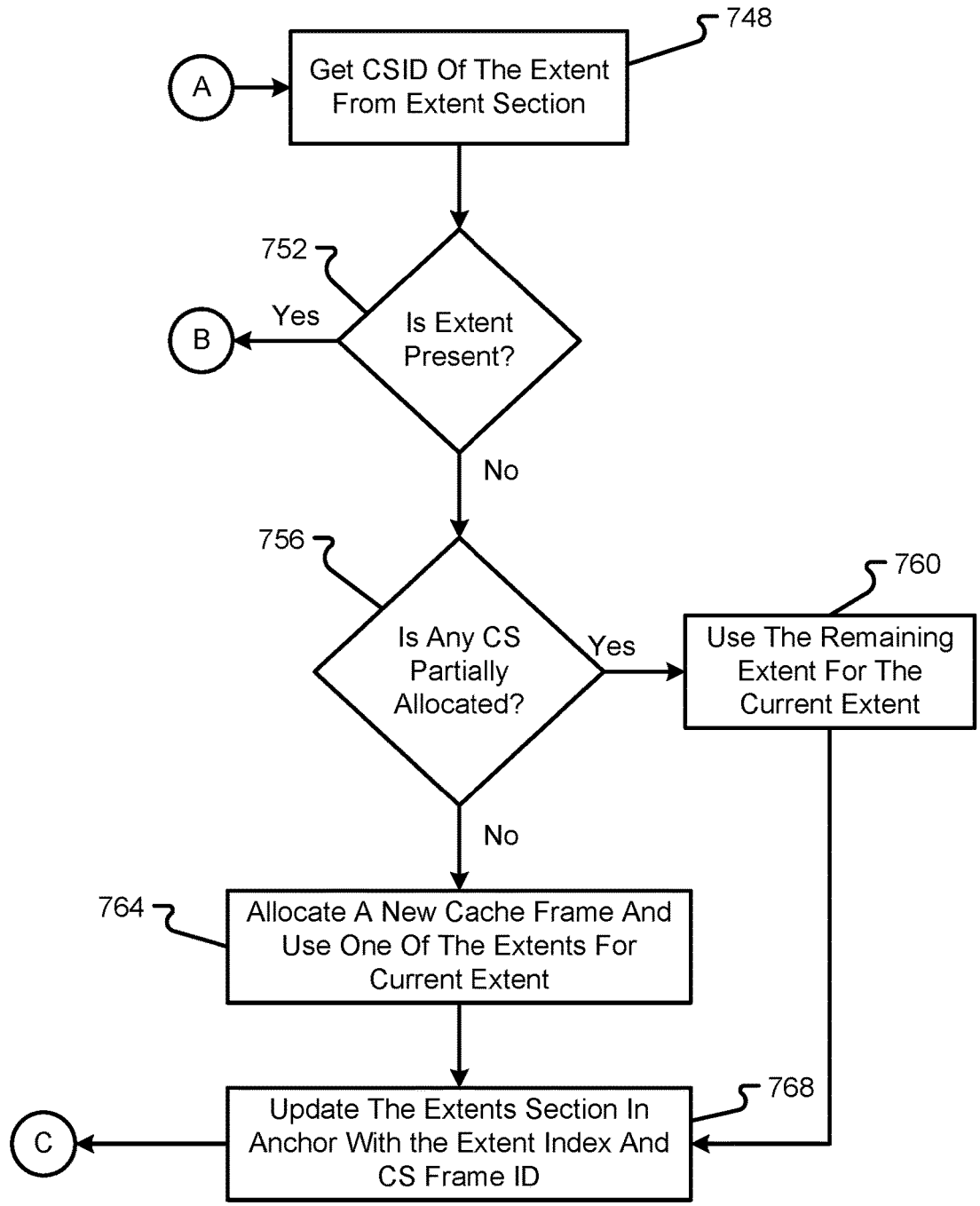
FIG. 7B is a second portion of the flow diagram from FIG. 7A.

With reference now to FIGS. 7A and 7B, a method of processing an extent will be described in accordance with at least some embodiments of the present disclosure. The method begins with the cache manager 252 obtaining a next ISGE from an ISGL for processing (step 704). The cache manager 252 then increments the ISGE index and loads the next chain ISGL if the ISGE is part of a chain of ISGEs (step 708). The cache manager 252 then checks in the identity section of the ISGE if the current extent index is the same as that of the cache frame anchor 228 (step 712). If the extent is determined to be different from the cache frame anchor (step 716), then the cache manager 252 proceeds by obtaining the cache segment ID of the extent from the extent section of the cache frame anchor 228 (step 748). The cache manager 252 then determines if the extent is present (step 752). If this query is answered affirmatively, then the method proceeds back to step 720. If the query is answered negatively, the method proceeds with the cache manager 252 determining whether any cache segment is partially allocated (step 756). If a cache segment is partially allocated, then the cache manager 252 will use the remaining portion of the partially allocated extent for the current extent (step 760) prior to updating the extents section in the cache frame anchor 228 with the extent index and the cache segment frame ID (step 768). If there are no partially allocated cache segments, then the cache manager 252 will proceed by allocating a new cache frame and use one of the extents therefrom for the current extent (step 764). Thereafter, the method will proceed to step 768. After performance of step 768, the method proceeds to step 724 where the current buffer segment section is loaded into local memory and processing of the buffer segment IDs begins.

Referring back to step 716, if the extent is the same as the anchor, then the method proceeds with the cache manager 252 allocating local memory for a buffer segment extent to be updated (step 720). Once allocated, then buffer segment section is loaded into local memory (step 724). The cache manager 252 then determines if the buffer segment is currently in use (step 728). In this step the cache manager 252 may determine whether the buffer segment is currently undergoing a flush or read process. If so, then the cache manager 252 copies the buffer segment flags into a global buffer segment ID table (step 732) prior to updating the buffer segment table, making the buffer segment flags as dirty, incrementing the buffer segment index, and decrementing the number of blocks (step 736). If the query of step 728 was answered negatively, then the method simply proceeds directly to step 736.

Thereafter, the cache manager 252 determines if the number of blocks equals zero or all buffer segments in the current extent have been processed (step 740). If so, the method ends (step 744). If not, the method returns to step 704.

Figure 8A:
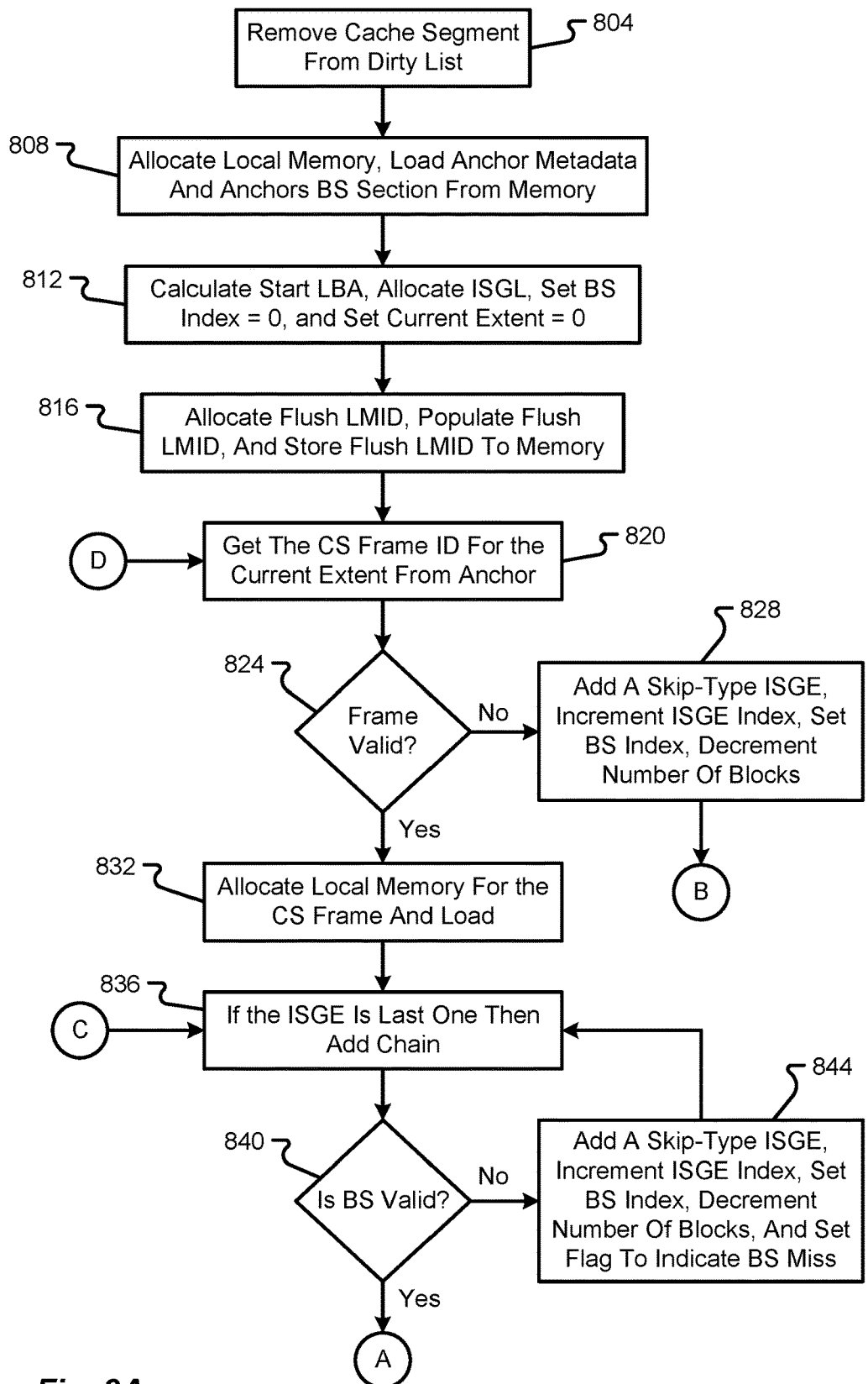
FIG. 8A is a first portion of a flow diagram depicting a method of flushing a cache in accordance with at least some embodiments of the present disclosure.
Figure 8B:
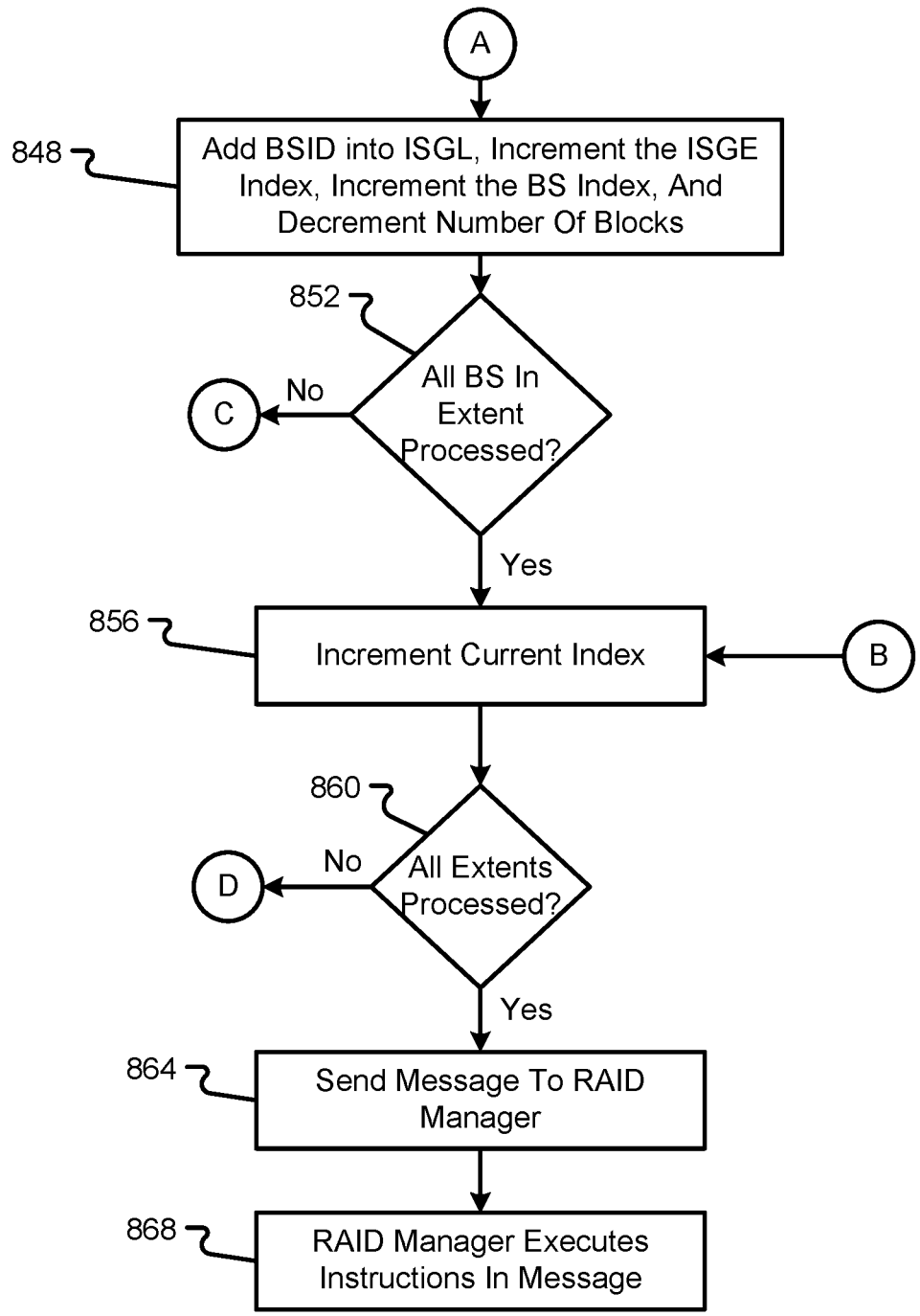
FIG. 8B is a second portion of the flow diagram from FIG. 8A.

With reference now to FIGS. 8A and 8B, a method of flushing a cache segment will be described in accordance with at least some embodiments of the present disclosure. Flushing a cache segment involves removing the cache segment from a dirty list, allocating ISGLs, populating the ISGLs with buffer segments to represent the snapshot of the cache segment, and sending an appropriate command to the RAID manager 256.

The method of flushing a cache segment begins by removing the cache segment from the dirty list (step 804). The cache manager 252 then allocates local memory for the cache segment, loads the anchor metadata and cache frame anchor 248 buffer segment section 360 from memory (step 808). The cache manager 252 then calculates the start LBA, allocates the ISGL corresponding to the first ISGL, sets the buffer segment index to zero and sets the current extent value to zero (step 812). The cache manager 252 then allocates a flush LMID and populates the LMID with a start strip value, a load number value, and an identifier of the lead ISGL. The flush LMID is then stored into local memory (step 816).

The cache manager 252 continues by obtaining the cache segment frame ID of the current extent from the cache frame anchor 228 (step 820). The cache manager 252 then determines if the frame is valid (step 824). If not, then a skip-type ISGE is added with a count of 16 (if the extent size is 16 buffer segments), the ISGE index is incremented, the buffer segment index is set to zero, and the number of blocks is decremented by 15 (if the extent size is 16 buffer segments) (step 828). Then the method proceeds to step 856 as will be discussed later. As can be appreciated, if the extent size is a value different than 16 buffer segments per extent, then the count values are added and decremented according to the extent size.

Referring back to step 824, if the frame is determined to be valid, then the cache manager 252 continues by allocating local memory for the cache segment frame and the cache segment frame is then located from memory (step 832). It should be appreciated, however, that there is no need to load the cache segment frame again if the cache segment frame is already loaded.

Then the cache manager 252 determines if the ISGE is the last one in the buffer segment and, if so, adds another ISGE to begin a chain of ISGEs (step 836). The cache manager 252 will then determine if the buffer segment is valid (step 840). If the query of step 836 is answered negatively, then the cache manager 252 adds a skip-type ISGE, increments the ISGE index, increments the buffer segment index, decrements the number of blocks by one, and sets a flag to indicate that there is a buffer segment miss (step 844). The method then returns to step 836.

Once the buffer segment is determined to be valid, the cache manager 252 will add the buffer segment ID into the ISGL, increment the ISGE index, increment the buffer segment index, and decrement the number of blocks (step 848). The cache manager 252 then determines if all of the buffer segments in the extent have been processed (step 852). If this query is answered negatively, then the method returns to step 836. If this query is answered positively (or if the frame was determined to be invalid in step 824), then the method proceeds with the cache manager 252 incrementing the current index (step 856). The cache manager 252 then determines if all of the extents have been processed (step 860). If the query of step 860 is answered negatively, then the method returns to step 820. If the query of step 860 is answered positively, then the method proceeds with the cache manager 252 sending a message to the RAID manager 256 to perform the appropriate write commands (step 864). In some embodiments the message transmitted between the cache manager 252 and the RAID manager 256 corresponds to a flush LMID.

The method then proceeds with the RAID manager 256 executing the instructions consistent with the LMID received from the cache manager 252 (step 868). In some embodiments, the RAID manager 256 may load the LMID, get the lead ISGL identifier, get the strip number from the LMID, get the physical disk number from the strip number, and the start LBA for the physical disk. Then RAID manager 256 may then parse the ISGL and issue an I/O command for each contiguous set of buffers. Once all of the writes have been completed, then an appropriate command is returned to the cache manager 252 to indicate that the cache has been updated.

Figure 9A:
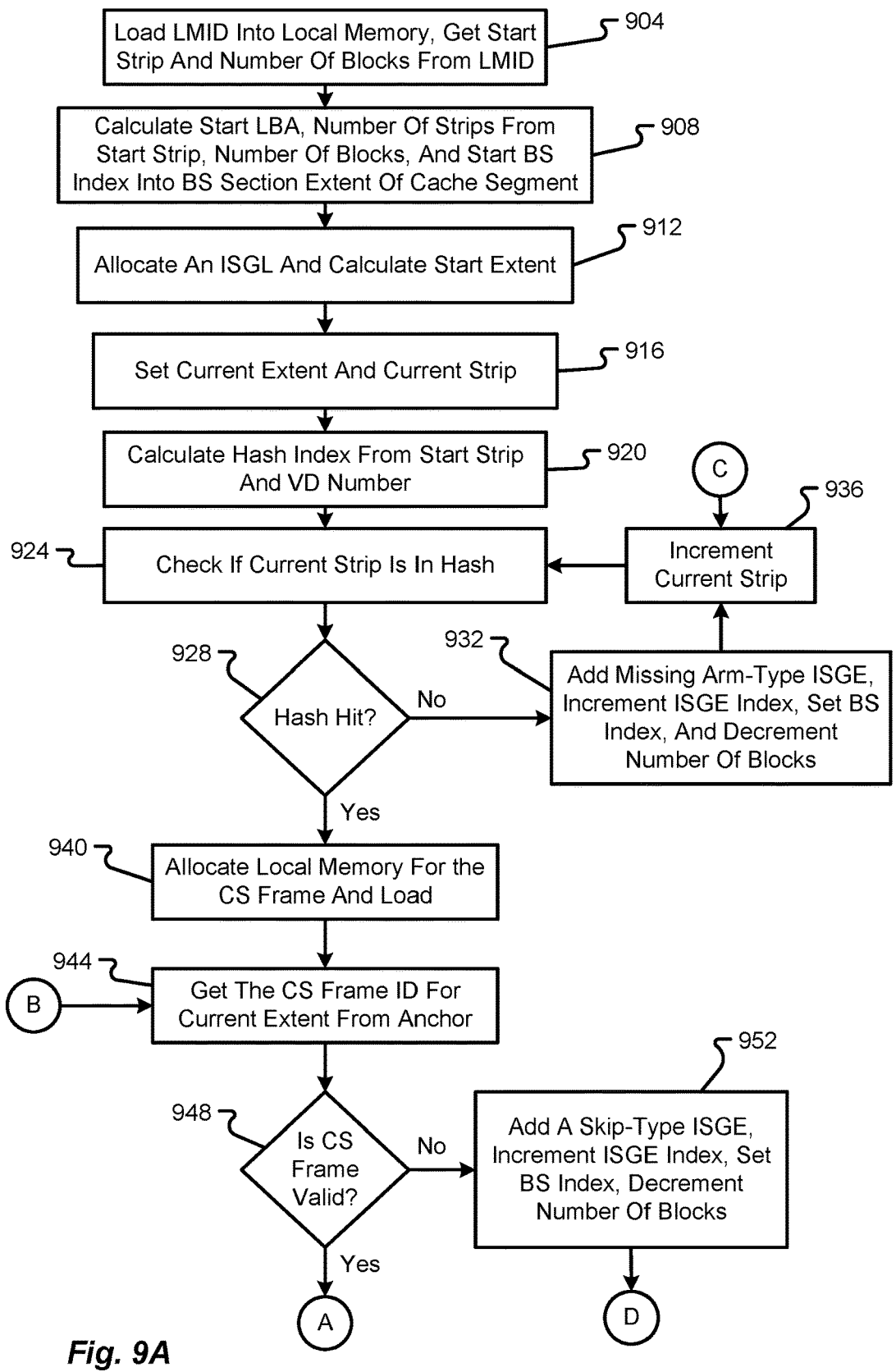
FIG. 9A is a first portion of a flow diagram depicting a method of performing a cache scan in accordance with at least some embodiments of the present disclosure.
Figure 9B:
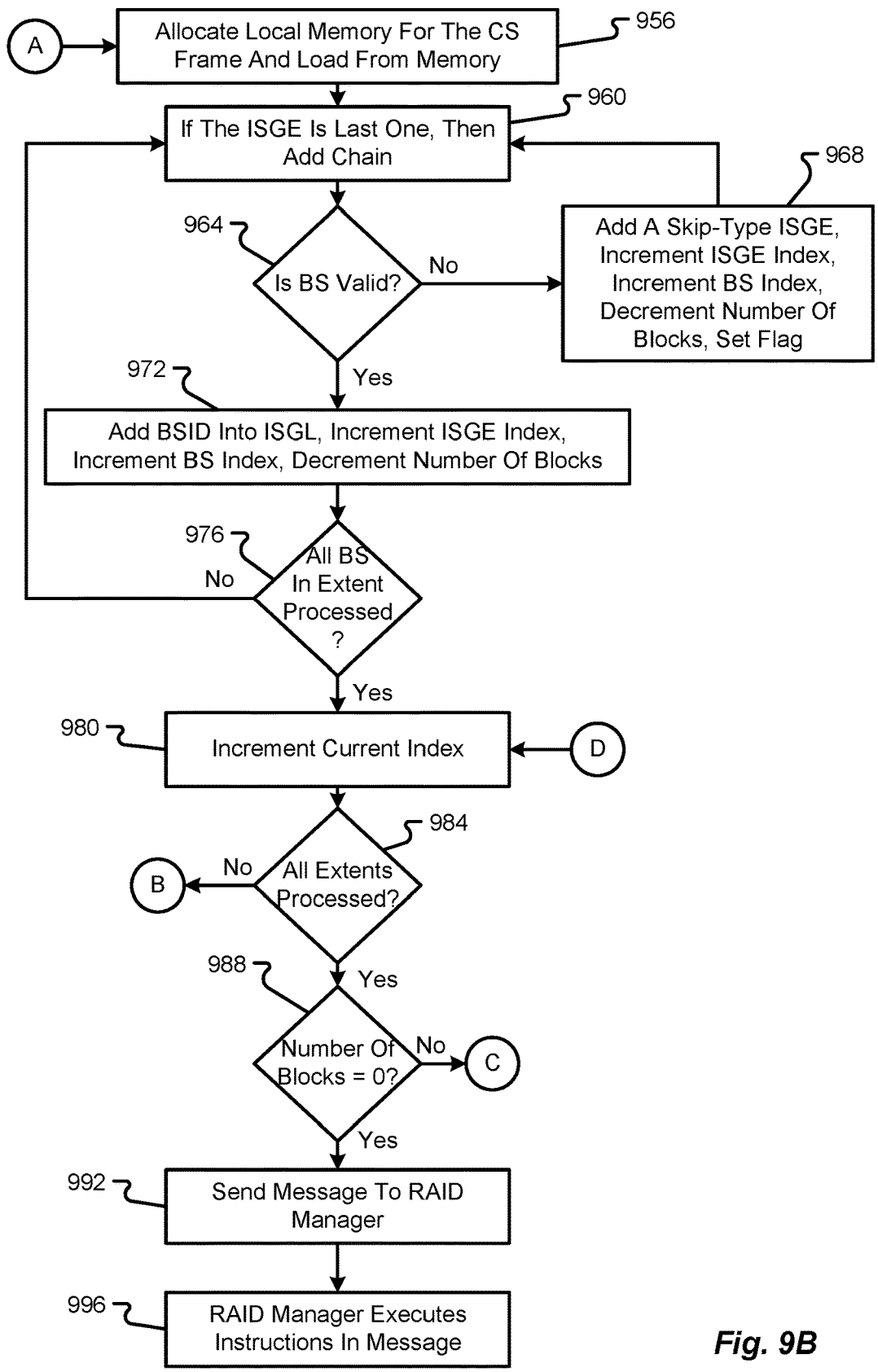
FIG. 9B is a second portion of the flow diagram from FIG. 9A.

With reference now to FIGS. 9A and 9B, a method of performing a cache scan will be described in accordance with at least some embodiments of the present disclosure. The method begins with the cache manager 252 loading an LMID into local memory and obtaining a start strip and number of blocks for the command from the LMID (step 904). The cache manager 252 then calculates the start LBA (from the start strip), the number of strips from the start strip, the number of blocks, and a start buffer segment index (step 908). The cache manager 252 may then allocate an ISGL 224 and calculate a start extent (step 912). The start extent may be calculated by dividing the start reference by the number of blocks per cache segment extent.

The cache manager 252 continues by setting a current extent and a current strip (step 916). In the beginning, the current extent is equal to the start extent and the current strip is equal to the start strip. The cache manager 252 then calculates a hash index from the start strip and from the VD number (step 920). In some embodiments, the calculated hash along with other global hash slots are loaded into local memory. The cache manager 252 then checks to see if the current strip is found in the hash slots (step 924). If a hash hit is not detected (step 928), then the cache manager 252 will add a missing arm-type ISGE, increment the ISGE index, set the buffer segment index, and decrement the number of blocks by the stripe size (step 932). Then the cache manager 252 increments the current strip (step 936) and returns back to step 924.

Referring back to step 928, if there is no hash hit found, then the cache manager 252 will allocate an appropriate amount of local memory for the cache segment and load the metadata from the cache frame anchor 228 along with the anchor's buffer segment section 360 from memory (step 940). The cache manager 252 then obtains the cache segment frame ID for the current extent from the cache frame anchor 228 (step 944). The cache manager 252 then determines if the cache segment frame is valid (step 948). If not, then the cache manager 252 will add a skip-type ISGE, increment the ISGE index, set the buffer segment index, and decrement the number of blocks by the extent size (e.g., 16 in the scenario where the extent represents 16 buffer segments). The method then proceeds to step 980, which will be discussed in further detail herein.

If the cache segment frame is determined to be valid, then the cache manager 252 allocates local memory for the cache segment frame and loads the cache segment frame (step 956). Of course, there is no need to load the cache segment frame if it has already been loaded from memory previously.

The method then proceeds with the cache manager 252 determining if the ISGE is not chained to any further ISGEs (e.g., is a last ISGE in a chain of ISGEs or is a lone ISGE) (step 960). If the ISGE is not chained to any further ISGEs, then the cache manager 252 adds another ISGE to create a chain of ISGEs. The cache manager 252 then determines if the buffer segment is valid (step 964). If the buffer segment is invalid, then the cache manager 252 adds a skip-type ISGE, increments the ISGE index, increments the buffer segment index, decrements the number of blocks by one, and sets a flag to indicate that there is a buffer segment miss (step 968). The method then returns to step 960.

If the buffer segment is determined to be valid at step 964, then the cache manager 252 continues by adding the buffer segment ID into the ISGL, incrementing the ISGE index, incrementing the buffer segment index, and decrementing the number of blocks by one (step 972). The cache manager 252 will then determine if all of the buffer segments in the extent have been processed (step 976). If this query is answered negatively, then the method returns to step 960. If the query is answered positively, then the cache manager 252 increments the current index (step 980). As mentioned above, this also occurs if the cache segment frame is determined to be invalid.

The cache manager 252 then determines if all of the extents have been processed (step 984). If false, the method returns to step 944. If true, then the cache manager 252 determines if the number of blocks is equal to zero (step 988). If the number of blocks is not equal to zero yet (e.g., there are remaining blocks that require processing), then the method returns to step 936. If the number of blocks does equal zero, then the cache manager 252 sends an appropriate message to the RAID manager 256 (step 992). In some embodiments, the transmitted message corresponds to an LMID. The RAID manager 256 loads the LMID and obtains the lead ISGL ID along with the strip number. The RAID manager 256 also determines the physical disk number from the strip number and the start LBA for the physical disk is obtained from the strip. The RAID manager 256 then executes the instructions in the LMID by parsing the ISGL and forming/issuing an I/O command for each continuous set of buffers (step 996). Once all of the writes have been completed, the RAID manager 256 may inform the cache manager 252 that the cache has been appropriately updated.

Figure 10A:
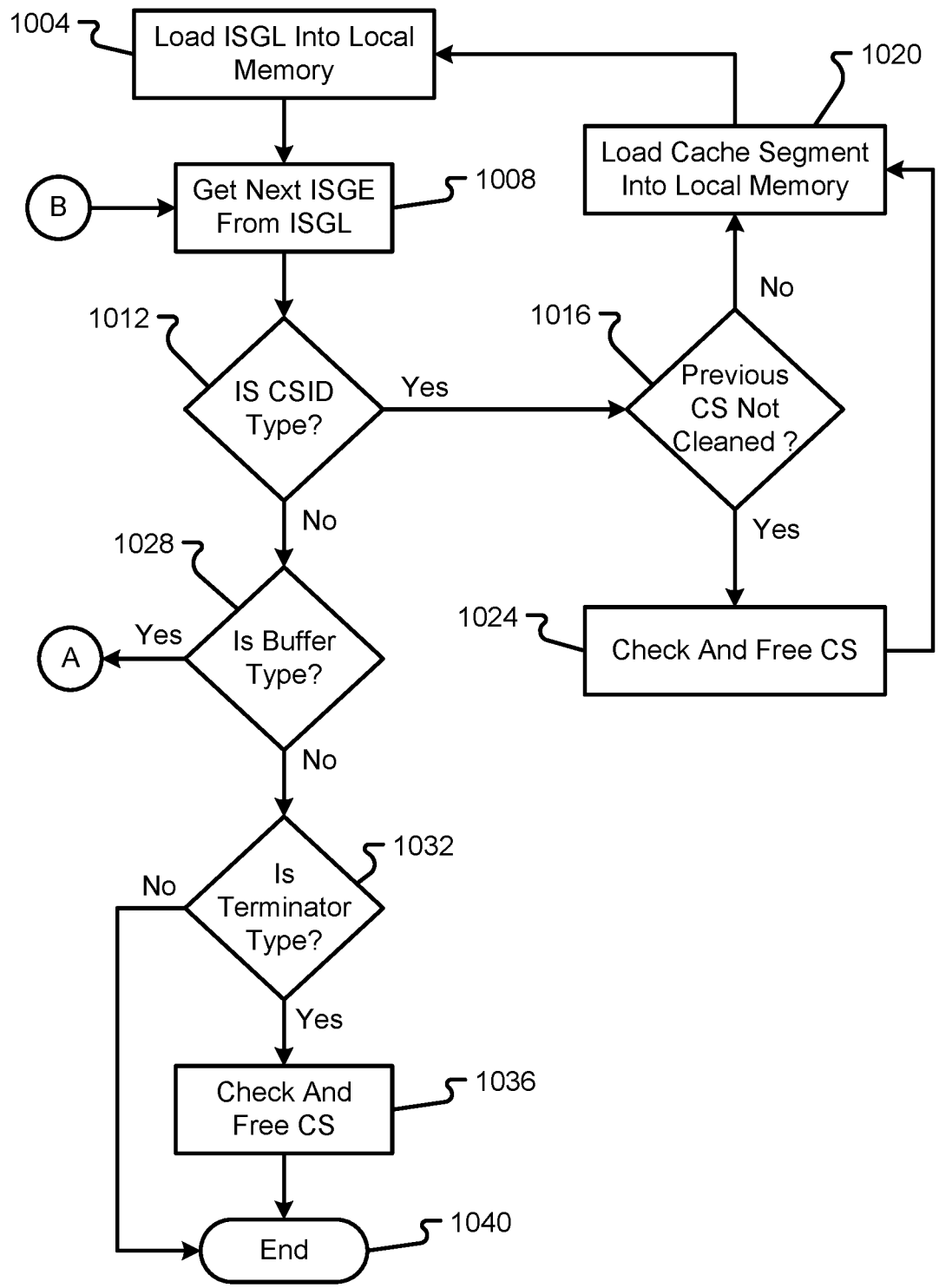
FIG. 10A is a first portion of a flow diagram depicting a method of performing a cache update in accordance with at least some embodiments of the present disclosure.
Figure 10B:
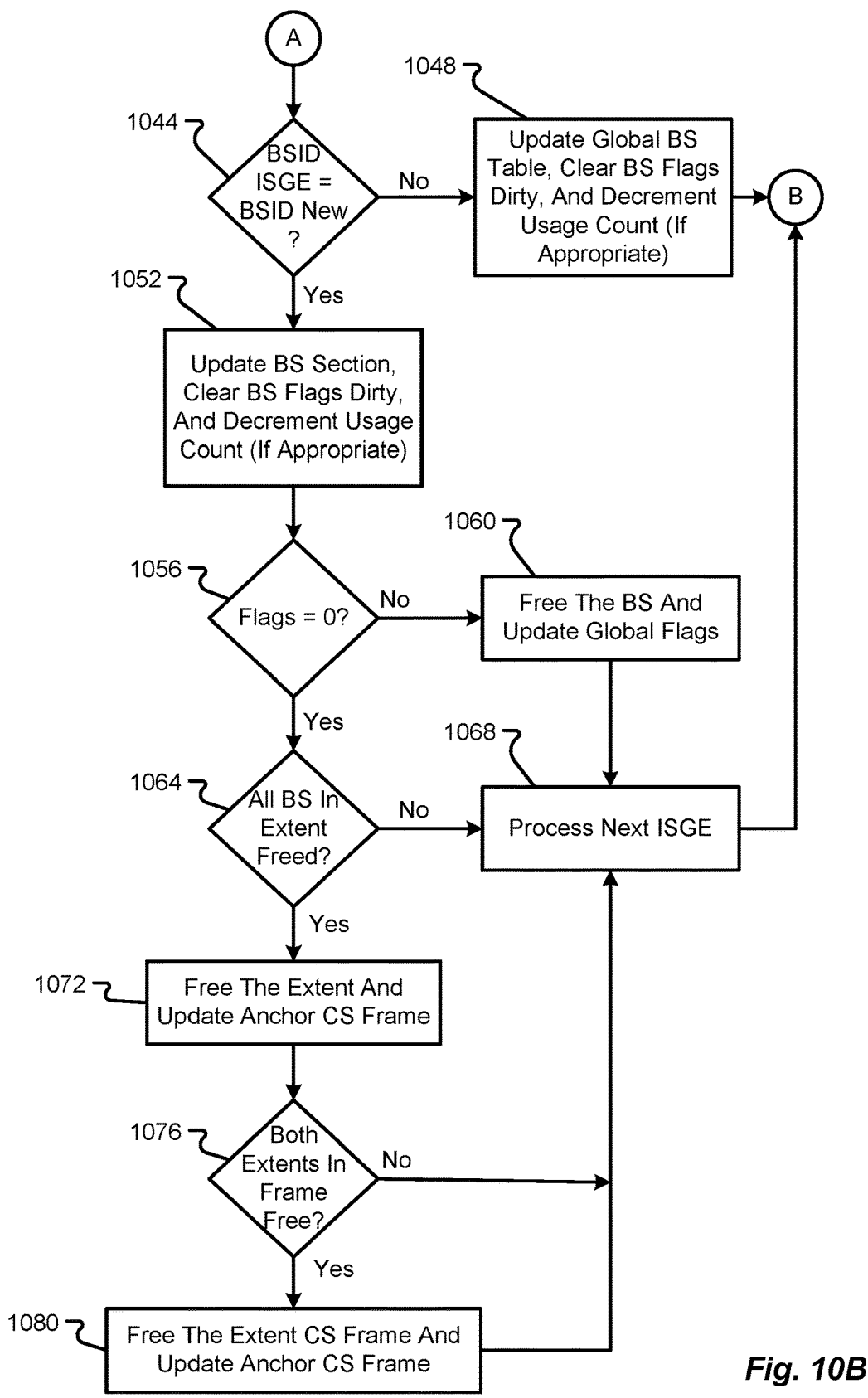
FIG. 10B is a second portion of the flow diagram from FIG. 10A.

With reference now to FIGS. 10A and 10B, a method of performing a cache update will be described in accordance with at least some embodiments of the present disclosure. The method begins with the cache manager 252 loading an ISGL into local memory for processing by the cache manager 252 (step 1004). The method proceeds with the cache manager 252 obtaining the next ISGE from the ISGL (step 1008). The cache manager 252 then determines if the next ISGE is of a cache segment ID type (step 1012). If this query is answered affirmatively, then the cache manager 252 determines whether or not the previous cache segment has been cleaned up (step 1016). If the previous cache segment is not cleaned, then the cache manager 252 checks and frees the cache segment (step 1024). Thereafter, or in the event that the previous cache segment was already cleaned up, the cache manager will load the cache segment into local memory (step 1020). The method then returns to step 1004.

Referring back to step 1012, if the next ISGE is not of a cache segment ID type, then the cache manager 252 determines whether the next ISGE is of a buffer type (step 1028). If the ISGE is not of a buffer type, then the method proceeds by determining if the next ISGE is of a terminator type (step 1032). If this query is answered negatively, then the process ends (step 1040). If the next ISGE is of a terminator type, then the cache manager checks and frees the cache segment (step 1036) prior to the process ending at step 1040.

Referring back to step 1028, if the next ISGE is determined to be of a buffer type, the method proceeds with the cache manager 252 determining if the buffer segment ID of the next ISGE is a new buffer segment ID (step 1044). If not, then the cache manager 252 will update the global buffer segment table, clear the buffer segment flags as dirty, and decrement the usage count if the update is in a read context (step 1048). The method then proceeds back to step 1008.

If the query of step 1044 is answered affirmatively, then the method proceeds with the cache manager 252 updating the buffer segment section (as opposed to the global buffer segment table), clearing the buffer segment flags as dirty, and decrementing the usage count if the update is in a read context. Thereafter, the cache manager 252 determines if the flags have a value of zero (step 1056). If not, then the buffer segment is freed and the global flags table is updated (step 1060). Thereafter, the cache manager 252 moves on to begin processing the next ISGE (step 1068), which ultimately returns the method back to step 1008.

If the flags have a value of zero and all buffer segments in the extent have not been freed (step 1064), then the method will proceed to step 1068 without executing step 1060. If, however, all of the buffer segments have been freed as determined in step 1064, then the method proceeds with the cache manager 252 freeing the entire extent and updating the cache frame anchor (step 1072). In other words, once the cache manager 252 knows that all buffer segments have been freed for a particular extent, then the cache manager 252 is able to free the entire extent.

The cache manager 252 will continue by determining if both extents in the same frame have been freed (step 1076). If this is answered negatively, then the method returns to step 1068. If the query of step 1076 is answered positively, then the method continues with the cache manager 252 freeing the entire extent cache segment frame and updating the cache frame anchor 228 accordingly (step 1080).

Figure 11:
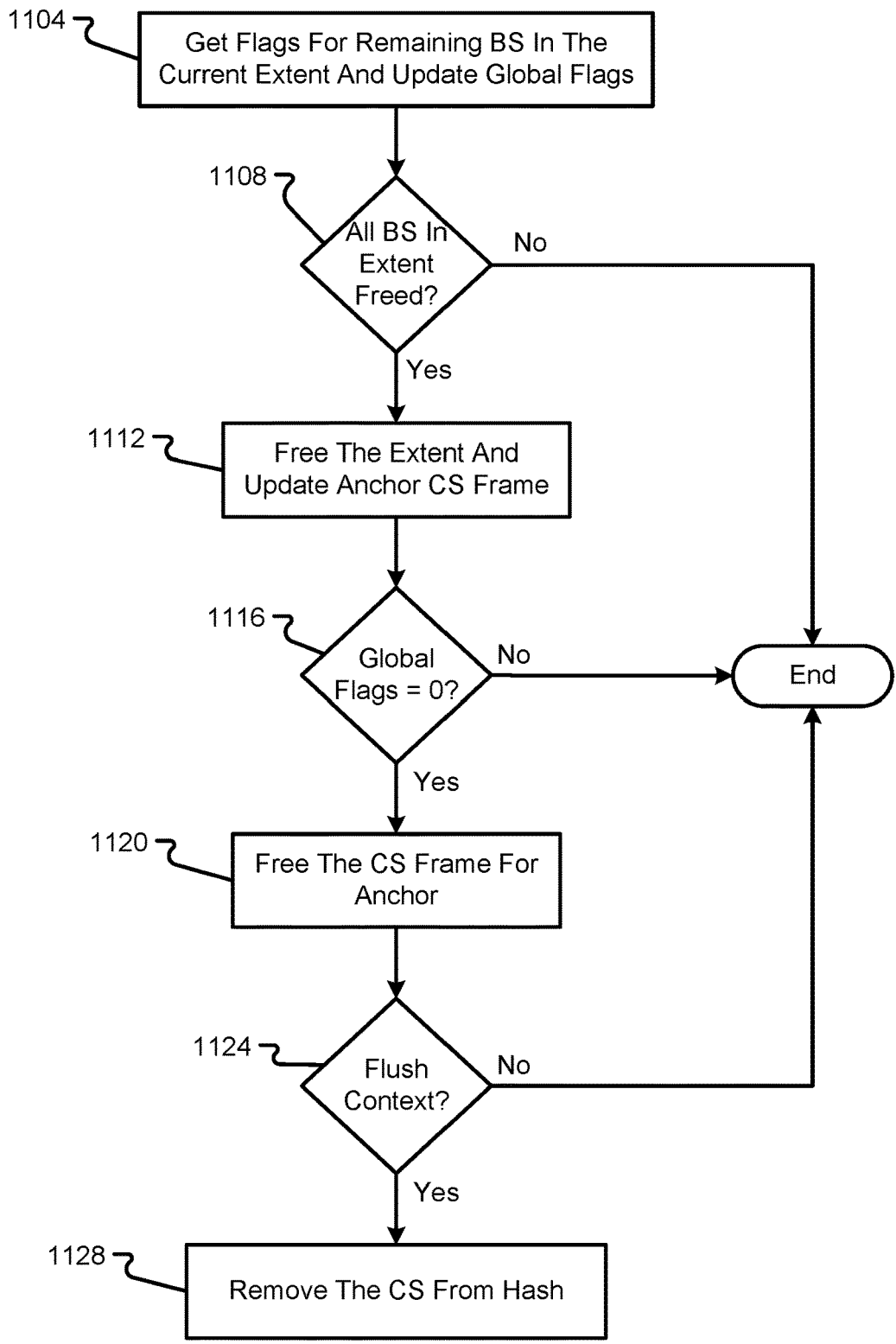
FIG. 11 is a flow diagram depicting a method of checking and freeing a cache segment in accordance with at least some embodiments of the present disclosure.

With reference now to FIG. 11, a method of checking and freeing a cache segment will be described in accordance with at least some embodiments of the present disclosure. The method begins with the cache manager 252 getting the flags for the remaining buffer segments in a current extent and updating global flags as appropriate (step 1104). The cache manager 252 then determines if all buffer segments in an extent have been freed (step 1008). If this query is answered negatively, then the method ends. However, if the query is answered affirmatively, then the method proceeds with the cache manager 252 freeing the current extent and updating the cache frame anchor 228 to reflect the same (step 1112).

The cache manager 252 then determines if the global flags have a value of zero (step 1116). If not, then the method ends. If so, then the method continues with the cache manager 252 freeing the cache segment frame for the anchor 228 (step 1120). The cache manager 252 then determines if the flags indicate a flush context (e.g., the current cache segment is in process of being flushed) (step 1124). If this query is answered negatively, then the process ends. If the query is answered affirmatively, then the method proceeds with the cache manager 252 removing the cache segment from the hash entirely (step 1128).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of managing cache buffering, the method comprising:
   receiving an Input/Output (I/O) command from a host system at a storage controller, the I/O command requiring one or more blocks of memory from a cache memory;
   parsing the I/O command at the storage controller with a host I/O manager to extract command instructions therefrom;
   generating, at the host I/O manager, at least one local message that includes the command instructions extracted from the I/O command;
   transmitting the at least one local message to a cache manager; and
   enabling the cache manager to work in local memory to execute the command instructions contained in the at least one message, wherein the cache manager is configured to chain multiple buffer segments together on-demand to support multiple stripe sizes that are specific to the I/O command received from the host system, wherein each buffer segment is represented by a corresponding extent, and wherein the cache manager groups extents as extents are created so as to have at least two extents sharing a single frame.

2. The method of claim 1, wherein at least some buffer segments in the chain of multiple buffer segments belong to a common extent and are aligned and contiguous buffer segments.

3. The method of claim 2, wherein the common extent comprises at least sixteen aligned and contiguous buffer segments.

4. The method of claim 2, wherein the cache manager groups extents two-by-two as extents are created.

5. The method of claim 4, wherein the cache manager updates two nibbles of a cache frame anchor to indicate which two extents among a plurality of extents share a frame that is referenced in an extent frame identification field in the cache frame anchor.

6. The method of claim 5, wherein the cache frame anchor comprises an extents section and a buffer section and wherein the extents section comprises the extent frame identification field and the two nibbles and wherein the buffer section comprises a plurality of buffer segments belonging to a particular extent that is referenced in the extents section.

7. The method of claim 6, wherein the cache frame anchor comprises a hash section, a dirty list section, and an identity section that enable the cache frame anchor to represent the variable stripe sizes.

8. The method of claim 1, wherein the cache manager is executed by the storage controller.

9. The method of claim 1, wherein the I/O command comprises at least one of a read command and a write command and wherein the at least one local message comprises a Local Message Identifier (LMID) that is used to refer to an identifier of a local message frame.

10. A storage system, comprising:
    a controller comprising a processor and memory having instructions stored thereon that are executable by the processor, the instructions including:
       a host Input/Output (I/O) manager that receives I/O commands from a host system and generates a corresponding local message for distribution within the controller; and
       a cache manager that is configured to work in local memory to execute command instructions contained in local messages received from the host I/O manager and, in response thereto, chain multiple buffer segments together on-demand to support multiple stripe sizes that are specific to the I/O command received from the host system, wherein each buffer segment is represented by a corresponding extent, and wherein the cache manager groups extents as extents are created so as to have at least two extents sharing a single frame.

11. The system of claim 10, wherein at least some buffer segments in the chain of multiple buffer segments belong to a common extent and are aligned and contiguous buffer segments.

12. The system of claim 11, wherein the common extent comprises at least sixteen aligned and contiguous buffer segments.

13. The system of claim 11, wherein the cache manager groups extents two-by-two as extents are created.

14. The system of claim 13, wherein the cache manager updates two nibbles of a cache frame anchor to indicate which two extents among a plurality of extents share a frame that is referenced in an extent frame identification field in the cache frame anchor.

15. The system of claim 14, wherein the cache frame anchor comprises an extents section and a buffer section and wherein the extents section comprises the extent frame identification field and the two nibbles and wherein the buffer section comprises a plurality of buffer segments belonging to a particular extent that is referenced in the extents section.

16. The system of claim 15, wherein the cache frame anchor comprises a hash section, a dirty list section, and an identity section that enable the cache frame anchor to represent the variable stripe sizes.

17. The controller of claim 15, wherein the cache frame anchor comprises an extents section and a buffer section and wherein the extents section comprises the extent frame identification field and the two nibbles and wherein the buffer section comprises a plurality of buffer segments belonging to a particular extent that is referenced in the extents section.

18. A controller situated between a host system and a data storage array, the controller comprising:
a processor; and
memory coupled to the processor, the memory including instructions that, when executed by the processor, enable the controller to perform the following:
receive an Input/Output (I/O) command from the host system, the I/O command requiring one or more blocks of memory from a cache memory;
parse the I/O command to extract command instructions therefrom;
generate at least one local message that includes the command instructions extracted from the I/O command;
transmit the at least one local message; and
chain multiple buffer segments together on-demand to support multiple stripe sizes that are specific to the I/O command received from the host system, wherein each buffer segment is represented by a corresponding extent, and wherein as extents are created extents are grouped so as to have at least two extents sharing a single frame.

19. The controller of claim 18, wherein at least some buffer segments in the chain of multiple buffer segments belong to a common extent and are aligned and contiguous buffer segments and wherein the extents are grouped two-by-two as extents are created.

20. The controller of claim 19, wherein the controller is further enables to update two nibbles of a cache frame anchor to indicate which two extents among a plurality of extents share a frame that is referenced in an extent frame identification field in the cache frame anchor.

* * * * *